W. F. SAUNT.
AERIAL MACHINE.
APPLICATION FILED NOV. 7, 1916.
1,226,599.
Patented May 15, 1917.
4 SHEETS—SHEET 3.
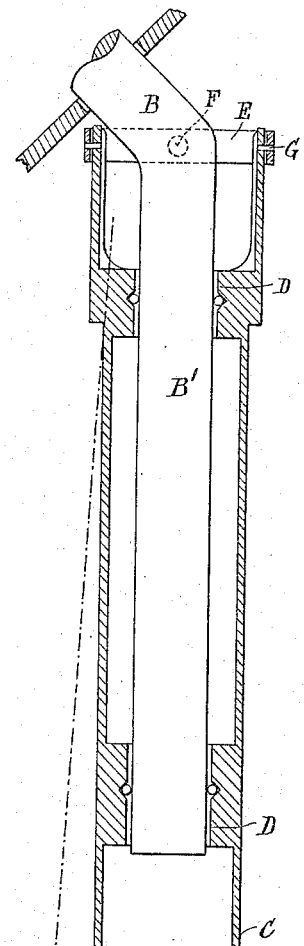
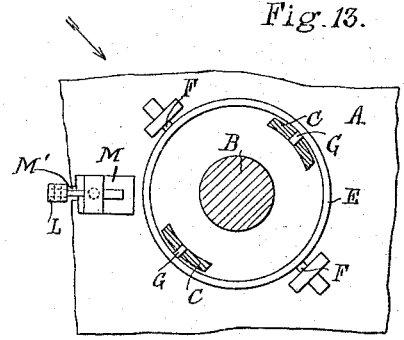
Fig. 15.
Fig. 13.
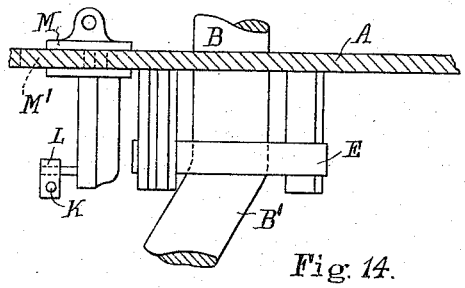
Fig. 14.
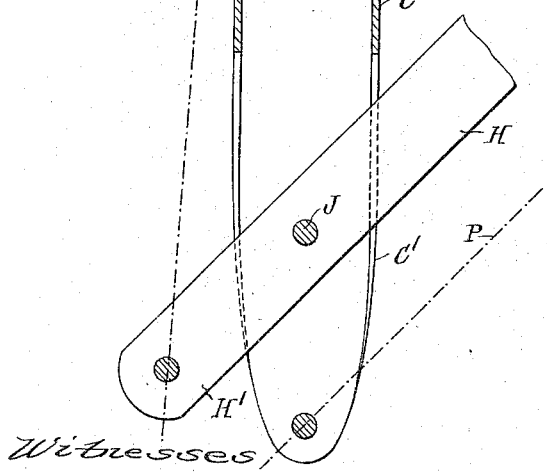
Inventor
William F. Saunt
by
Attorney

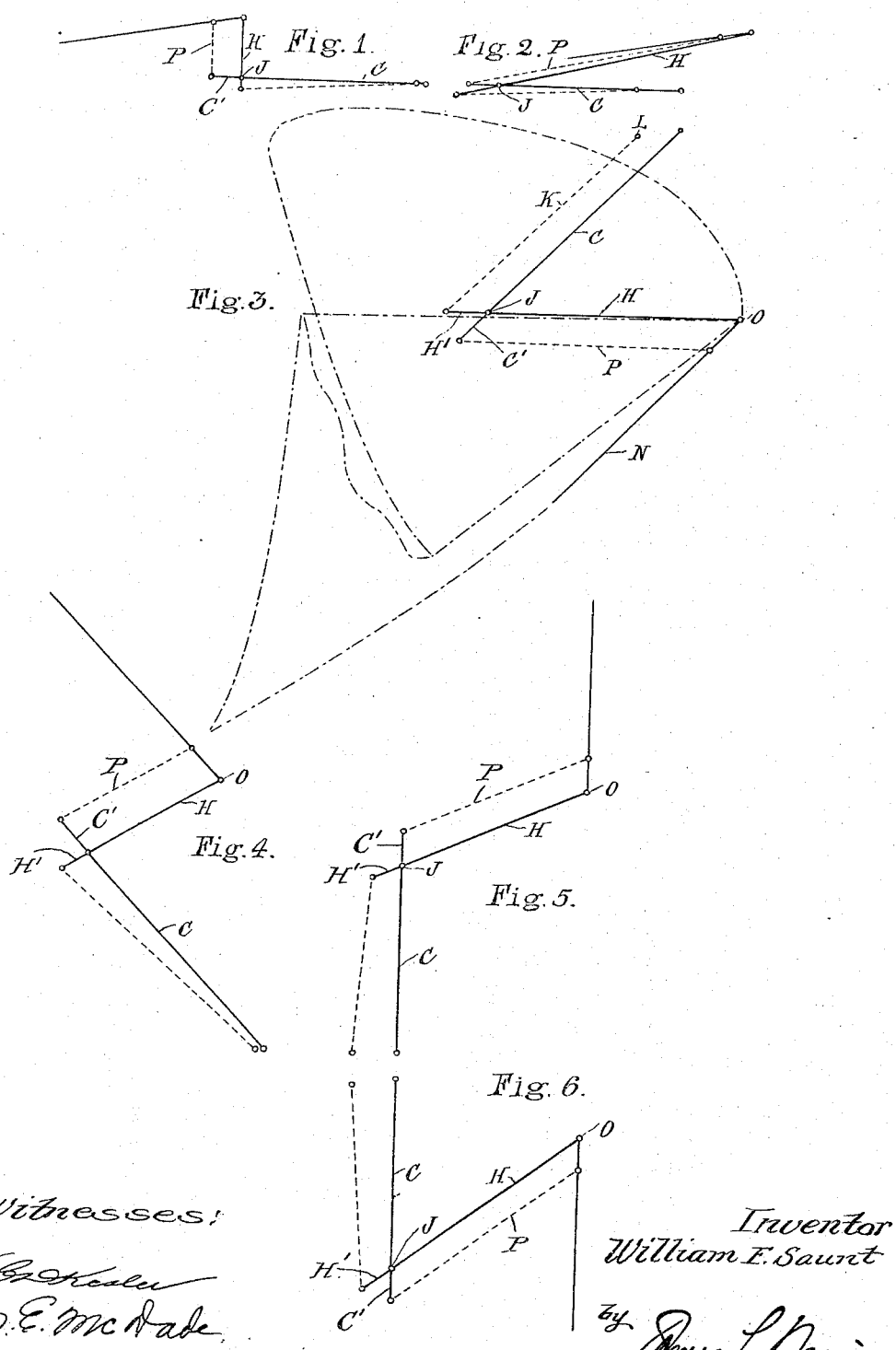

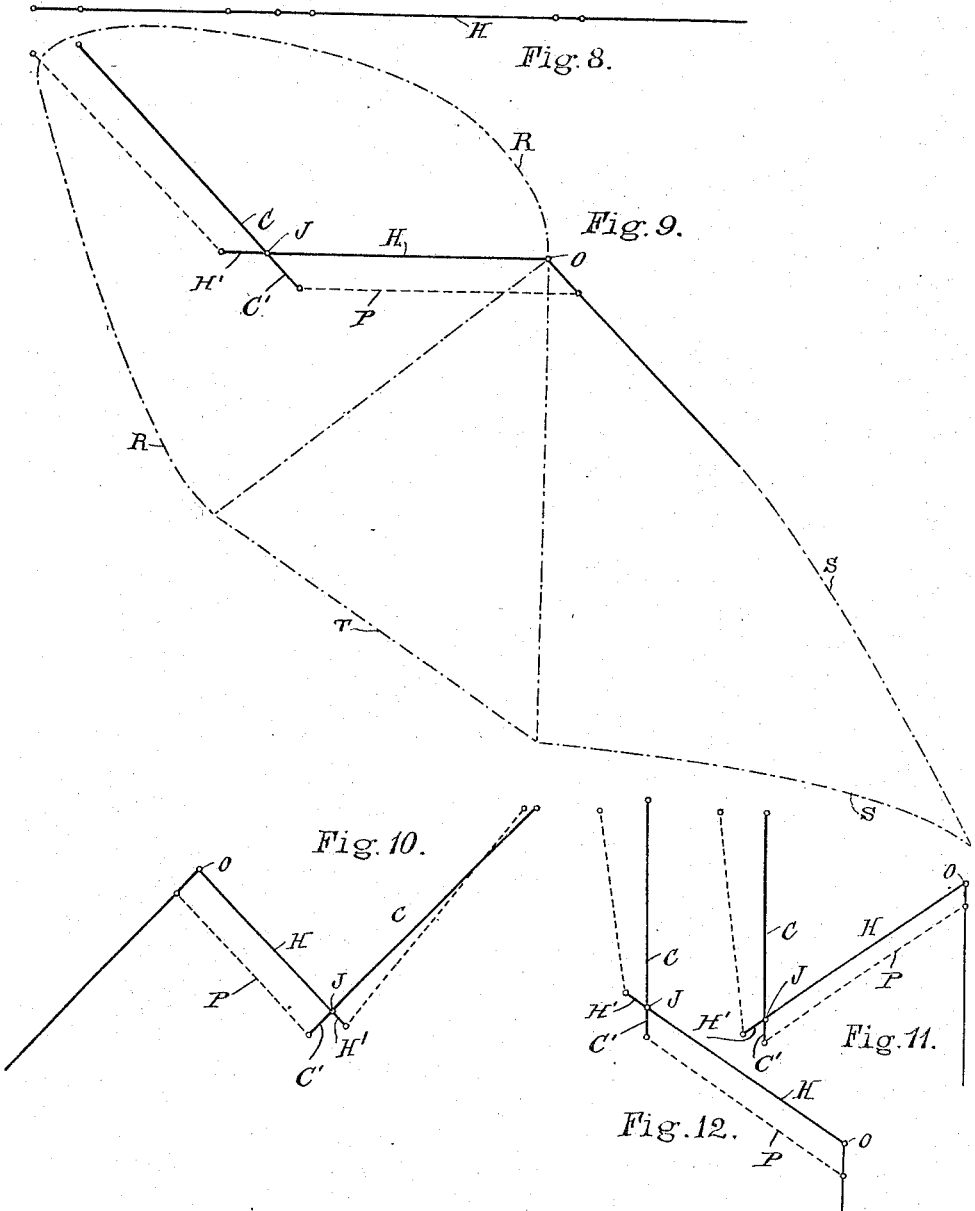

W. F. SAUNT.
AERIAL MACHINE.
APPLICATION FILED NOV. 7, 1916.

1,226,599.

Patented May 15, 1917.
4 SHEETS—SHEET 4.

Witnesses:

Inventor
William F. Saunt
by
James L. Norris
Attorney

UNITED STATES PATENT OFFICE.

WILLIAM FREDERIC SAUNT, OF LUNDY ISLAND, VIA INSTOW, NORTH DEVON, ENGLAND.

AERIAL MACHINE.

1,226,599. Specification of Letters Patent. Patented May 15, 1917.

Application filed November 7, 1916. Serial No. 130,051.

*To all whom it may concern:*

Be it known that I, WILLIAM FREDERIC SAUNT, a subject of the King of Great Britain, residing at Lundy Island, via Instow, North Devon, England, have invented a new and useful Improvement in Aerial Machines of the Ornithopter Type, of which the following is a specification.

My invention relates to an improved aerial machine of the kind wherein there are wings or planes, the member of which next the fuselage or body of the machine is supported on a universal joint so as to be capable of moving in a conical path without turning on its own axis.

According to my invention, the member of the wing or plane next the fuselage is made in the form of a tube or hollow frame and has extending into it a driving shaft, which is inclined relatively to its axis of rotation and which turns in bearings in said tube.

Where the wing is made in three parts or members like the wing of a bird, that is, a humerus, an ulna and a hand, all pivotally mounted one on the other, the ulna-rod or member is connected to the body or fuselage by means of a link or the like which engages at one end with said ulna-rod at a suitable distance from its pivotal axis on the humerus and is pivotally mounted at the other end on the fuselage. The link or the like that connects the ulna to the body or fuselage is preferably adjustably mounted on the said body or fuselage so as to enable the oscillation of the ulna relatively to the humerus during the conical motion of the humerus to be varied as desired.

By my invention, an aerial machine can be produced which is capable of rising from the ground, the deck of a ship or other support and of alighting on such support at a slow speed and which, when the wings are held stationary, is capable of planing down in a similar manner to an aeroplane. Moreover, by adding a rotary screw-propeller to the body of the aerial machine, either at the front or rear thereof, the speed can be increased as desired. This rotary propeller may be driven either by the same or by a separate engine or motor to that employed for actuating the wings.

In the accompanying drawings, I have shown how my said invention may be conveniently and advantageously carried into practice. In these drawings:

Figures 1, 2 and 3 are respectively an elevation looking from the front of the aerial machine, an elevation looking from the side of the aerial machine, and a plan, showing diagrammatically the members of the right-hand wing in the position in which the humerus extends rearward in a horizontal position.

Figs. 4, 5 and 6 are corresponding views to Figs. 1, 2 and 3, in which the humerus extends upward in a vertical plane.

Figs. 7, 8 and 9 are corresponding views to Figs. 1, 2 and 3, in which the humerus extends horizontally in a forward direction. In these three views, there are also shown the fabric-covered frames mounted on the wing-members.

Figs. 10, 11 and 12 are corresponding views to Figs. 1, 2 and 3, in which the humerus extends downward in a vertical plane.

Fig. 13 is an elevation partly in vertical section showing the universal joint connecting the humerus and the fuselage.

Fig. 14 is a plan corresponding to Fig. 13.

Fig. 15 is a longitudinal central section of the humerus looking in the direction indicated by the arrow in Fig. 13.

Figure 16:
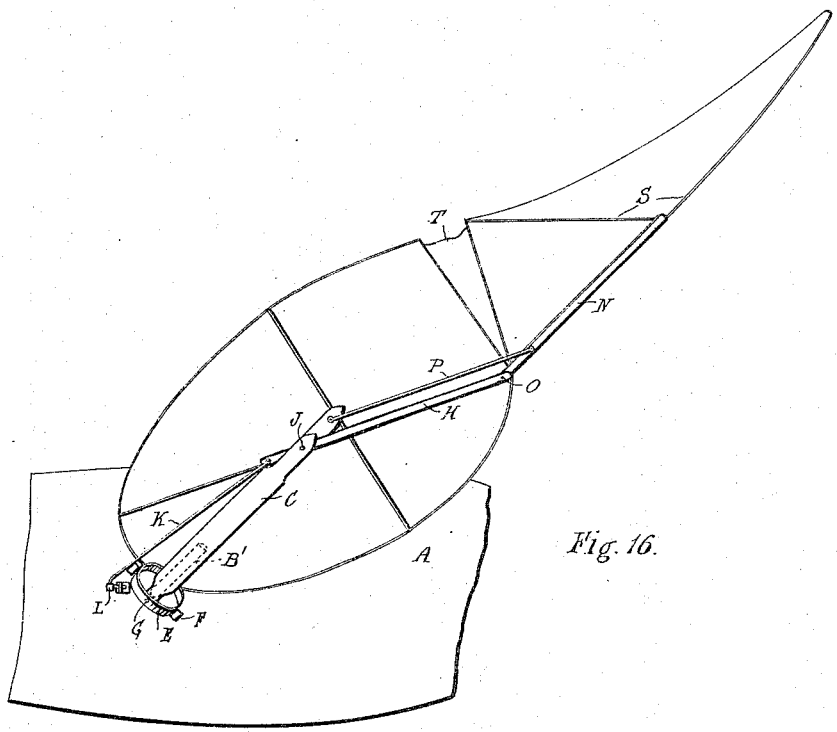
Fig. 16 is a perspective view of a wing in its elevated position, as viewed from a side of the aerial machine.

A is the fuselage or body of the aerial machine. B is the main shaft for driving the wings. This shaft is provided with bent ends or extensions B′, which extend into the humerus-tube C and turn in ball-bearings D, D therein. The humerus tube C is connected to the body A by means of a universal joint in the form of a gimbal frame E pivoted at F, F to the fuselage A and at G, G to the humerus-tube C, thus enabling it to follow the conical motion described by the shaft-extension B′ without rotating on its own axis. The ulna-rod H is pivoted at J to the end of the humerus and is provided with an extension H′ connected by means of a link or radius-rod K and a universal joint L to a slide M movable by means of suitable controls in a guide-way M′ in the body A, so as to enable it to be moved toward or away from the main shaft B and thereby vary the throw of the ulna on the humerus. That is to say, when the joint L is moved toward the shaft B, the wing is folded and when it is moved away from the shaft B, the wing is extended. On the other end of the ulna, a wing-pinion or member N, corresponding to the hand of a bird's wing is pivoted at O and is pivotally connected by a link P to an extension C' of the outer end of the humerus-tube C. The ulna H and wing-pinion N respectively bear frames R, S over which a suitable fabric is stretched to form wing sections. The frames or sections R, S can be connected by loose fabric T which is preferably stretched tight when the wing is in its extended position, Figs. 7 to 9. In the first position, Figs. 1, 2 and 3, the frames or sections R, S are folded substantially one over the other. In the second position, Figs. 4, 5 and 6, the sections are moving forward and only partly overlap. In the third position, Figs. 7, 8 and 9, the sections R, S have reached a substantially horizontal position and are fully extended with the connecting fabric T taut. In the fourth position, Figs. 10, 11 and 12, the sections R, S are again beginning to fold one over the other.

The main shaft B is driven through suitable gearing from an engine, which is also capable of driving a propeller-shaft bearing a propeller arranged at the rear of and beneath the body A.

If desired, instead of covering the wing-frames with fabric as above described, they may be provided with feathers built up from sheet and rod metal in any suitable manner. These feathers may be pivotally attached at their inner ends to the ulna-rod H and wing-pinion N and be also pivotally connected to a connecting rod or bar actuated by link-work from the adjacent members of the wing so as to cause the feathers to be extended and to fold over each other as the wing opens and closes.

What I claim is:—

1. In an aerial machine, a body, a wing-plane comprising a hollow member adjacent to said body, a gimbal-frame directly connecting said hollow-member of the wing-plane to said body and serving to support said wing-plane on said body, a driving shaft rotatably mounted in said body, an extension of said driving shaft inclined relatively to the axis of rotation of said driving shaft, and bearings in said hollow member of the wing-plane for receiving said inclined shaft extension.

2. In an aerial machine, a body, a wing-plane comprising pivotally connected members, a universal joint connecting said wing-plane to said body, means for imparting a conical motion to the wing-plane-member or humerus adjacent to said body, an ulna-rod pivotally-mounted on the end of the humerus and a link which is pivotally connected to said ulna-rod at a suitable distance from its pivotal axis on the humerus and which is also pivotally connected to the body.

3. In an aerial machine, a body, a wing-plane comprising pivotally connected members, a universal joint connecting said wing-plane to said body, means for imparting a conical motion to the wing-member or humerus adjacent to said body, an ulna-rod pivotally-mounted on the end of the humerus, a link which is pivotally connected to said ulna-rod at a suitable distance from its pivotal axis on the humerus and is also pivotally connected to the body, and means for adjusting the position of the pivotal connection between said link and said body.

4. In an aerial machine, a body, a wing-plane comprising a hollow humerus, an ulna, and a hand pivotally connected together, a universal joint connecting said humerus and said body, a driving shaft rotatably mounted in said body, an extension of said driving shaft inclined relatively to the axis of rotation of said driving shaft, said shaft-extension turning in bearings in said humerus, a link pivotally connecting said body and said ulna at a suitable distance from its pivotal axis on the humerus, means for adjusting the position of the pivotal connection between said link and said body, and a link pivotally connecting said humerus and said hand.

WILLIAM FREDERIC SAUNT.

Witnesses:
 HERBERT A. BEESTON,
 CONRAD ARNOLD.

Copies of this patent may be obtained for five cents each, by addressing the "Commissioner of Patents, Washington, D. C."